(12) United States Patent
Mizuta et al.

(10) Patent No.: US 12,504,940 B2
(45) Date of Patent: Dec. 23, 2025

(54) AUGMENTED REALITY DISPLAY CONTROL DEVICE FOR CONTROLLING INFORMATION COMMONLY ARRANGED IN A COMMON VIRTUAL SPACE

(71) Applicant: NTT DOCOMO, INC., Tokyo (JP)

(72) Inventors: Reo Mizuta, Chiyoda-ku (JP); Yasuo Morinaga, Chiyoda-ku (JP); Tatsuya Nishizaki, Chiyoda-ku (JP); Yuki Nakamura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/294,690

(22) PCT Filed: Aug. 2, 2022

(86) PCT No.: PCT/JP2022/029702
§ 371 (c)(1),
(2) Date: Feb. 2, 2024

(87) PCT Pub. No.: WO2023/026798
PCT Pub. Date: Mar. 2, 2023

(65) Prior Publication Data
US 2024/0289080 A1 Aug. 29, 2024

(30) Foreign Application Priority Data
Aug. 23, 2021 (JP) .................. 2021-135589

(51) Int. Cl.
*G06F 3/14* (2006.01)
*G06F 3/01* (2006.01)
(52) U.S. Cl.
CPC ............ *G06F 3/1454* (2013.01); *G06F 3/012* (2013.01); *G06F 3/013* (2013.01); *G06F 2203/011* (2013.01)

(58) Field of Classification Search
CPC ........ G06F 3/1454; G06F 3/012; G06F 3/013; G06F 2203/011
See application file for complete search history.

(56) References Cited

U.S. PATENT DOCUMENTS

2014/0368534 A1* 12/2014 Salter ...................... G06F 3/012
345/619
2015/0253571 A1* 9/2015 Chen .................... G02B 27/017
345/8

(Continued)

FOREIGN PATENT DOCUMENTS

| JP | 2018-91882 A | 6/2018 |
| JP | 2020102232 A * | 7/2020 |
| WO | WO 2019/220729 A1 | 11/2019 |

OTHER PUBLICATIONS

Japanese Office Action issued Jul. 9, 2024 in Japanese Application 2023-543777, (with English translation), 6 pages.

(Continued)

*Primary Examiner* — Benjamin C Lee
*Assistant Examiner* — Nathan P Brittingham
(74) *Attorney, Agent, or Firm* — Oblon, McClelland, Maier & Neustadt, L.L.P.

(57) ABSTRACT

A display control device is a device that controls display on the display that displays display information commonly arranged in a common virtual space with another display in accordance with the line of sight of each of the displays in the virtual space, and includes a detection unit configured to detect a state of a user who wears the other display, a visual field information acquisition unit configured to acquire information on a visual field of the virtual space corresponding to the line of sight in the virtual space on the other display, and a control unit configured to control an operation related to display on the display in accordance with the (Continued)

detected state of the user and the acquired information on the visual field of the virtual space.

7 Claims, 7 Drawing Sheets

(56) References Cited

U.S. PATENT DOCUMENTS

2016/0154435 A1\* 6/2016 Yanagisawa ......... H04N 13/383
　　　　　　　　　　　　　　　　　　348/47
2021/0110790 A1　 4/2021 Shigeta et al.

OTHER PUBLICATIONS

International Preliminary Report on Patentability and Written Opinion issued Mar. 7, 2024 in International Application No. PCT/JP2022/029702 (submitting English translation only), 6 pgs.
International Search Report mailed on Oct. 18, 2022 in PCT/JP2022/029702 filed on Aug. 2, 2022 (citing references 1 & 16-17 therein, 2 pages).

\* cited by examiner

AUGMENTED REALITY DISPLAY CONTROL DEVICE FOR CONTROLLING INFORMATION COMMONLY ARRANGED IN A COMMON VIRTUAL SPACE

TECHNICAL FIELD

The present invention relates to a display control device that controls display on a display.

BACKGROUND ART

Conventionally, a transmissive head-mounted display has been used (see, for example, Patent Literature 1). A transmissive head-mounted display allows a user to look at the real world and refer to information displayed on a display.

CITATION LIST

Patent Literature

[Patent Literature 1] Japanese Unexamined Patent Publication No. 2018-91882

SUMMARY OF INVENTION

Technical Problem

Conventionally, in a transmissive head-mounted display, information arranged in a virtual space has been displayed in accordance with the line of sight in the virtual space. In addition, in this case, the above line of sight is controlled to move in accordance with the orientation of the head-mounted display or the like. Through such control, a user who wears a head-mounted display can refer to information on a virtual space according to the orientation of his or her head or the like, and can look at the real world.

In addition, conventionally, a technique of sharing display on a display with another user's display has been used. Sharing display with another user can also be performed in the display of the above-described mode. For example, displaying common information by sharing a virtual space between head-mounted displays can be considered. In this case, when a user moves information displayed in the virtual space, the display position of the information moves on another user's display.

At this time, in a case where the user of the head-mounted display is performing actions other than looking at the display, the movement of information performed by another user may interfere with the user. For example, when the user of the other head-mounted display is looking at something in the real world instead of what is displayed on the display, the movement of displayed information in front of the user's eyes interferes with the user's action.

An embodiment of the present invention was contrived in view of such circumstances, and an object thereof is to provide a display control device that makes it possible to perform display appropriately in a case where information on a common virtual space between a plurality of displays is displayed.

Solution to Problem

In order to achieve the above object, according to an embodiment of the present invention, there is provided a display control device configured to control display on a display that displays display information commonly arranged in a common virtual space with another display in accordance with a line of sight of each display in the virtual space, the device including: a detection unit configured to detect a state of a user who wears the other display; a visual field information acquisition unit configured to acquire information on a visual field of the virtual space corresponding to the line of sight in the virtual space on the other display; and a control unit configured to control an operation related to display on the display in accordance with the state of the user detected by the detection unit and the information on the visual field of the virtual space acquired by the visual field information acquisition unit.

In the display control device according to an embodiment of the present invention, the operation related to display on the display is controlled in accordance with the state of a user who wears the other display and the information on the visual field of the virtual space. For example, the display can be controlled so that the display on the other display due to display on the display does not interfere with the user in accordance with the state of the user who wears the other display. Therefore, with the display control device according to an embodiment of the present invention, it is possible to perform display appropriately in a case where information on a common virtual space between a plurality of displays is displayed.

Advantageous Effects of Invention

According to an embodiment of the present invention, it is possible to perform display appropriately in a case where information on a common virtual space between a plurality of displays is displayed.

DESCRIPTION OF EMBODIMENTS

Hereinafter, an embodiment of a display control device according to the present invention will be described in detail with reference to the accompanying drawings. Meanwhile, in the description of the drawings, the same components are denoted by the same reference numerals and signs, and thus description thereof will not be repeated.

Figure 1:
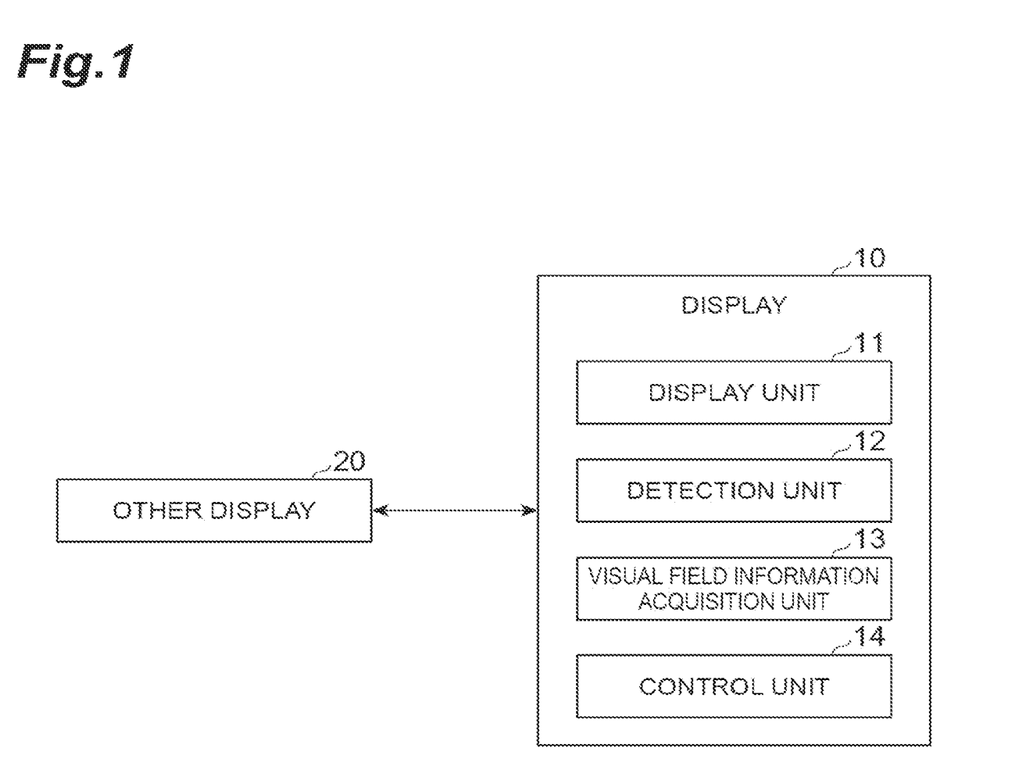
FIG. 1 is a diagram illustrating a functional configuration of a display which is a display control device according to an embodiment of the present invention.

FIG. 1 shows a display 10 which is a display control device according to the present embodiment. The display 10 which is a display device controls display on the display 10 itself. The display 10 displays display information commonly arranged in a common virtual space with another display 20 in accordance with the line of sight of each display in the virtual space. For example, the displays 10 and 20 display the display information arranged in a virtual three-dimensional space in accordance with the line of sight in the virtual space. The display information is information which is displayed on the displays 10 and 20. The display information is content such as, for example, characters, images, and moving images. Alternatively, the display information may be a scheduler, a browser, or the like of which the displayed content can be changed. In addition, the display information may be something that allows communication such as chatting between users of the displays 10 and 20. In addition, the display information may be any information other than the above insofar as it can be arranged in the virtual space and displayed in accordance with the line of sight in the virtual space.

The displays 10 and 20 are displays that display virtual content (display information) through, for example, augmented reality (AR) or the like. The displays 10 and 20 are transmissive displays which are worn over the users' eyes. For example, the displays 10 and 20 may be eyeglass type head-mounted displays, that is, see-through glasses (smart glasses or AR glasses). Meanwhile, the displays 10 and 20 are used by users different from each other. In addition, the display 10 does not need to be worn by the user.

The displays 10 and 20 display the display information of a region viewed from the reference position of the line of sight in the virtual space in the direction of the line of sight in the virtual space in a visible state. The line of sight in the virtual space is configured to include the reference position of the line of sight in the virtual space and the direction of the line of sight in the virtual space. The displays 10 and 20 can perform display by moving the line of sight in the virtual space. By moving the line of sight in the virtual space, the display information visible in the virtual space changes, and the display on the displays 10 and 20 also changes.

The movement of the line of sight in the virtual space is performed using a method set in advance. For example, the movement of the line of sight in the virtual space is performed with a degree of freedom set in advance. The degree of freedom set in advance is, for example, three degrees of freedom (3DoF). In 3DoF, the reference position of the line of sight in the virtual space is fixed, and only the direction of the line of sight in the virtual space can be rotated around the three axes of the virtual space, that is, an X axis, a Y axis, and a Z axis. However, the movement of the line of sight in the virtual space may be performed using degrees of freedom other than the above and methods other than the above.

Figure 2:
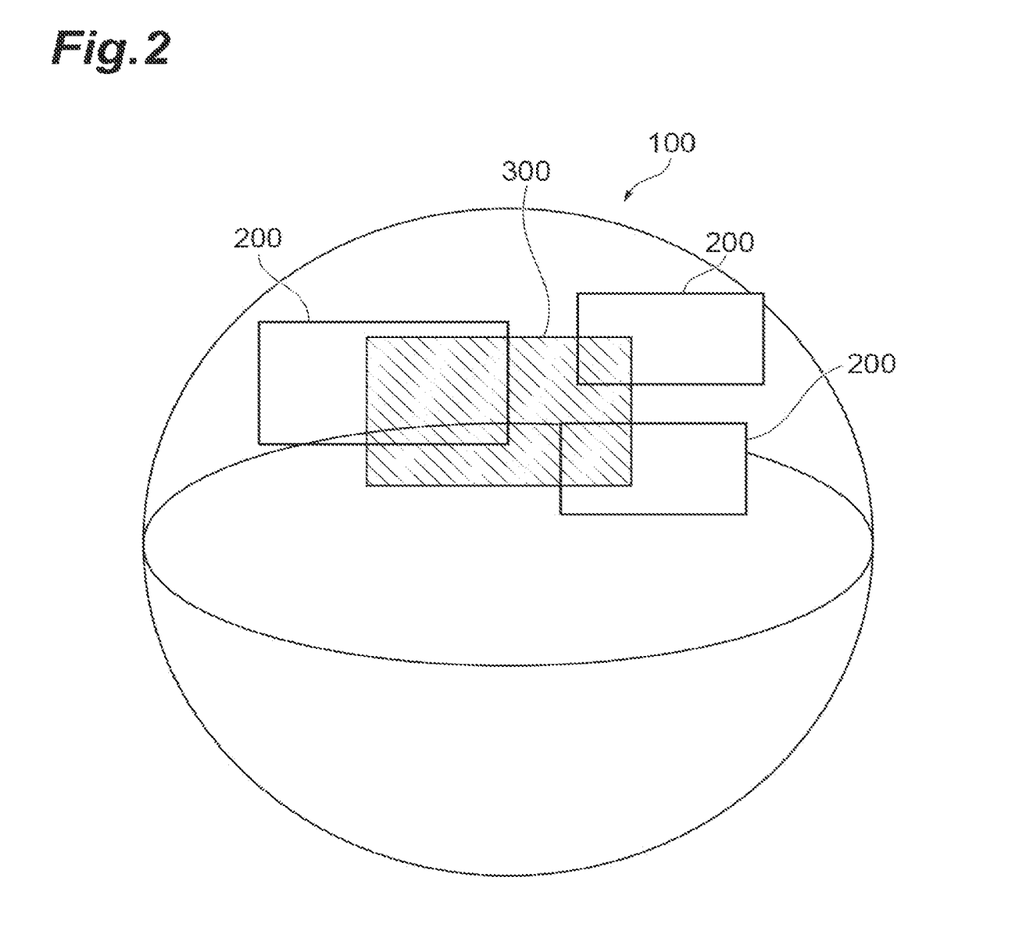
FIG. 2 is a diagram illustrating an example of a virtual space related to display on the display, display information arranged in the virtual space, and a region to be displayed.

For example, as shown in FIG. 2, a sphere (an entire celestial sphere) 100 is provided in the virtual space, and display information 200 is arranged along the sphere 100. For example, the planar display information 200 is arranged along the tangential plane of the sphere 100 toward the center of the sphere 100. That is, the display information 200 is arranged in so that it is visible from the center of the sphere 100. In this case, the center of the sphere 100 is set as the reference position of the line of sight in the virtual space.

The displays 10 and 20 display the display information 200 of a region 300 of the sphere 100 viewed from the reference position of the line of sight in the virtual space in the direction of the line of sight in the virtual space in a visible state. The shape of the region 300 is the shape of a display screen on the displays 10 and 20, for example, a rectangular shape as shown in FIG. 2. As described above, the viewing angles (angles at which the virtual space can be displayed) of the displays 10 and 20 are limited, and thus only a portion of the sphere 100 is displayed. In the example shown in FIG. 2, by changing the direction of the line of sight in the virtual space, the position of the region 300 of the sphere 100 changes, and the display on the displays 10 and 20 changes. In this way, the displays 10 and 20 may be entire celestial sphere displays. The above display on the displays 10 and 20 may be performed by an application for performing the display. The direction of the line of sight at the time of the startup of the application may be a default direction set in advance, or may be a different direction for each of the displays 10 and 20.

The displays 10 and 20 may be provided with sensors that detect the movement and orientation of the displays 10 and 20 themselves. For example, an acceleration sensor that detects acceleration and a gyro sensor that detects angular velocity may be provided. The displays 10 and 20 may detect the movement and orientation of the displays 10 and 20 themselves using these sensors, and may move the line of sight in the virtual space in accordance with the detected movement and orientation. That is, the line of sight may be moved in accordance with the direction of the head (face) of a user to whom the displays 10 and 20 are attached. However, the movement of the line of sight in the virtual space may be performed in accordance with detection performed by sensors other than those described above. In addition, the movement of the line of sight in the virtual space may be performed by a user's operation on the displays 10 and 20 rather than sensors. In addition, in a case where the line of sight is moved in 3DoF as described above, only the orientation need be detected or operated.

The display on the displays 10 and 20 using the line of sight in the virtual space including the movement of the line of sight in the virtual space may be performed in the same way as display using conventional AR or the like. Meanwhile, storing and processing of information relating to the virtual space may be performed in any of the displays 10 and 20, or may be performed in a cloud or the like which is connected to the displays 10 and 20.

In the display on the display 10 and the display on the other display 20, display information that is commonly arranged in a common virtual space is used. That is, the virtual space and display information may be shared between the plurality of displays 10 and 20. The plurality of displays 10 and 20 between which the virtual space and display information are shared are set in advance. The lines of sight in the virtual space to be used in the display on the display 10 and the display on the other display 20 are independent for each of the displays 10 and 20. When the lines of sight on the displays 10 and 20 are different, for example, in the case of 3DoF, when the directions of the lines of sight are different, different displays will be performed on the displays 10 and 20 in accordance with the lines of sight. When the lines of sight on the displays 10 and 20 are the same, for example, in the case of 3DoF as described above, when the directions of the lines of sight are the same, the displays 10 and 20 will perform the same display. Meanwhile, although an example in which the virtual space is shared by the two displays 10 and 20 is shown in the present embodiment, the virtual space may be shared by three or more displays 10 and 20.

Figure 3:
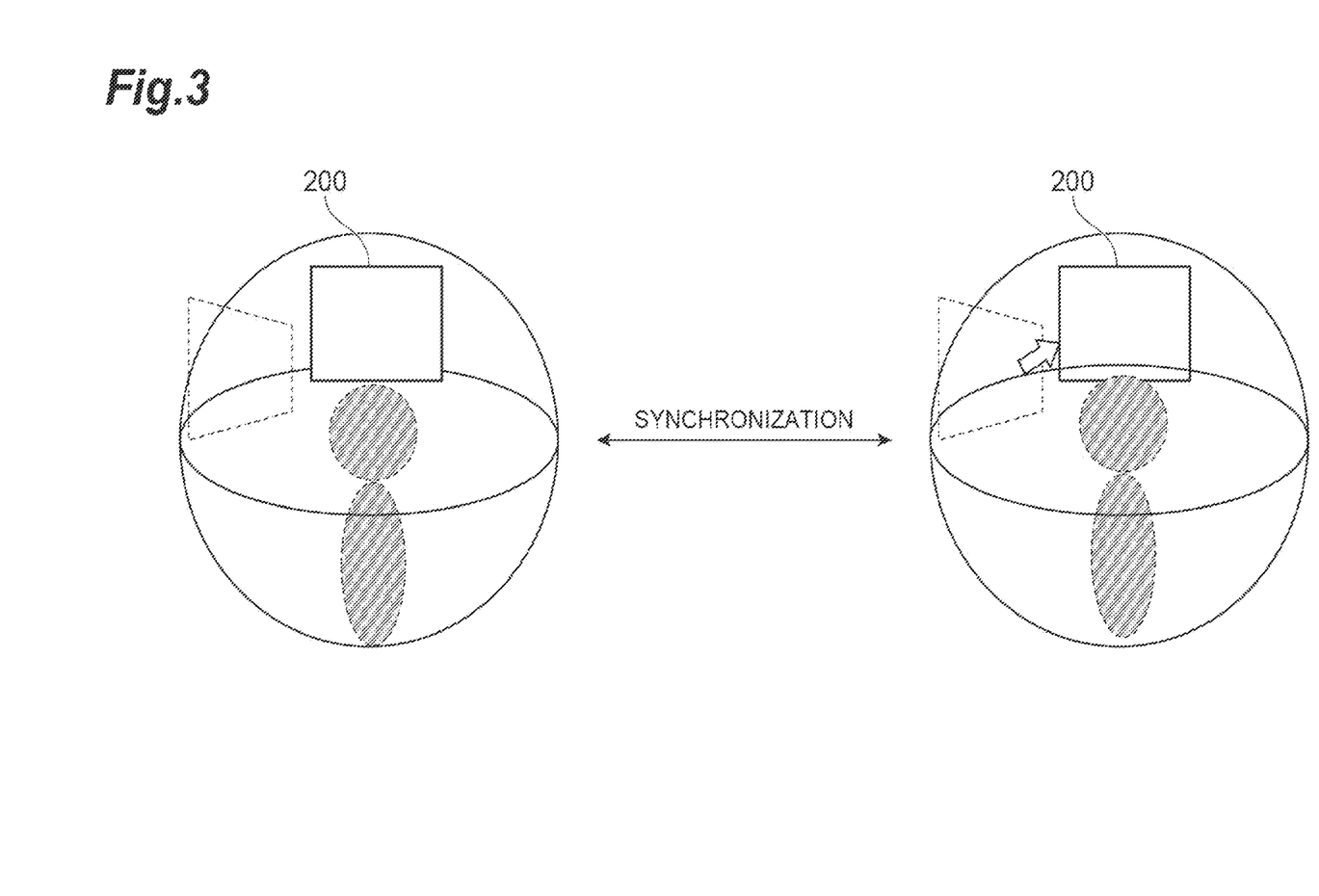
FIG. 3 is a diagram illustrating sharing of virtual space and display information between displays.

On the displays 10 and 20, operations related to display, for example, a user's operations on display information are performed. For example, as shown on the right side of FIG. 3, the displays 10 and 20 accept the user's operation for moving the display information 200 in the virtual space to move the display information 200. The arrangement of the display information 200 in the virtual space is common as described above, and thus when the display information 200 is moved on any of the displays 10 and 20, the display information 200 is also moved on the other of the displays 10 and 20 as shown on the left side of FIG. 3. Operations other than those described above may be performed on the displays 10 and 20. For example, operations such as enlarging and reducing the display information, inputting characters for the display information, and rotating the sphere 100 may be performed.

The operation may be performed using, for example, an information processing device such as a smartphone carried by a user who wears the displays 10 and 20. In that case, the displays 10 and 20 and the smartphone are connected to each other in advance so that information can be transmitted and received. When the user performs an operation on the smartphone, the operation is reflected in the display on the displays 10 and 20. In addition, display may be performed in which a laser pointer appears at a position at which the smartphone is pointed from the smartphone in the user's hand. The above display and operation on the displays 10 and 20 may be performed in the same way as in conventional methods.

Examples of the displays 10 and 20 capable of being used include conventional displays having the above functions. In addition, the displays 10 and 20 have a communication function. The communication function of the displays 10 and 20 is used to share the above virtual space and display information and to realize the functions according to the present embodiment. In addition, the above-described functions of the displays 10 and 20 and some of the functions according to the present embodiment to be described later may be included in an information processing device (for example, a smartphone) connected to a display device (for example, the above-described see-through glass). That is, the displays 10 and 20 according to the present embodiment may be realized to include a display device and an information processing device.

Assuming that the displays 10 and 20 are entire celestial sphere displays as described above, the displays 10 and 20 can display images, moving images, browsers, and the like as display information as described above, thereby constructing a work space dedicated to the user who wears the displays 10 and 20. In addition, by sharing the virtual space and display information between the plurality of displays 10 and 20 as described above, for example, it is possible to share the display information simultaneously with other remote users, as if a plurality of people had entered this entire celestial sphere display. In addition, assuming that the displays 10 and 20 are see-through glasses, it is possible to use the display information while performing other tasks in a real space, that is, to use them at the same time.

Subsequently, the functions of the display 10 according to the present embodiment will be described. As shown in FIG. 1, the display 10 is configured to include a display unit 11, a detection unit 12, a visual field information acquisition unit 13, and a control unit 14. In addition, the other display 20 that shares the virtual space and display information with the display 10 has functions corresponding to the functions of the display 10 according to the present embodiment. The function of the other display 20 will also be described together with the following description of the functions of the display 10 according to the present embodiment. In addition, the display 10 may have functions other than those described above which are included in a conventional display device such as a conventional see-through glass. In addition, the display 10 may have the functions of the other display 20 according to the present embodiment. The other display 20 may also have the functions of the display 10 according to the present embodiment.

The display unit 11 is a functional unit that performs display on the display 10. The display unit 11 inputs and displays display information to be displayed on the display 10. For example, the display unit 11 may input display information stored in the display 10, or may receive and input display information from the outside. As described above, the display unit 11 displays display information arranged in the virtual space in accordance with the line of sight in the virtual space. In addition, as described above, the display unit 11 shares the virtual space and display information with the other display 20. The virtual space and display information are shared with the other display 20, for example, by transmitting and receiving display information and information indicating the position of the virtual space where the display information is arranged. In addition, the virtual space and display information may be shared through a server with which each of the displays 10 and 20 can communicate rather than through direct exchange between the displays 10 and 20. In addition, the virtual space and display information may be shared between the displays 10 and 20 using methods other than the above. Meanwhile, information which is transmitted and received between the displays 10 and 20 other than the above may also be transmitted and received directly between the displays 10 and 20, or may be transmitted and received through a server through.

The display unit 11 accepts an operation related to display and executes the operation. The operation related to display is, for example, an operation of moving display information in the virtual space. In addition, the operation related to display may be any other operation. The operation related to display is performed by a user of the display 10. In a case where the display 10 is operated by the user, the operation related to display is accepted, for example, by accepting the user's input operation on the display 10.

Since the virtual space and display information are shared between the displays 10 and 20, the results of the operation related to display input on the display 10 are also reflected in the other display 20. Therefore, the display unit 11 transmits information indicating the accepted operation to the other display 20. The other display 20 receives the transmitted information indicating the operation and executes the operation so that the virtual space and display information are shared with the display 10. In addition, the display unit 11 receives information indicating the operation related to display performed on the other display 20 from the other display 20 and executes the operation so that the virtual space and display information are shared with the other display 20.

The above functions of the display unit 11 may be the same as conventional functions. In addition, as will be described later, the operation related to display performed by the display unit 11 is controlled by the control unit 14.

The detection unit 12 is a functional unit that detects the state of a user who wears the other display 20. The detection unit 12 may detect the line of sight of the user in a real space as the state of the user who wears the other display 20. The detection unit 12 may detect the focal length of the line of sight of the user in the real space as the state of the user who wears the other display 20. The detection unit 12 may detect the direction of the line of sight of the user in the real space as the state of the user who wears the other display 20. The detection unit 12 may detect the movement state of the user as the state of the user who wears the other display 20.

For example, the detection unit 12 receives information relating to detection from the other display 20 and performs the above detection. In this case, the other display 20 is provided with a sensor for detecting the state of the user who wears the other display 20, and the sensor is used to detect the state of the user. In a case where the line of sight of the user in the real space is detected, the other display 20 is provided with a camera capable of capturing an image of the user's eyeball. The other display 20 transmits the image of the user's eyeball obtained by image capturing with the camera to the display 10.

The detection unit 12 receives an image from the other display 20. The detection unit 12 detects the line of sight of the user in the real space, more specifically, the focal length and direction of the line of sight, from the image of the user's eyeball received from the other display 20. For example, the detection unit 12 detects the movement of the user's eyeball from a moving image of the user's eyeball, and detects the focal length and direction of the line of sight on the basis of the movement. The detection unit 12 detects, for example, the distance from the eyeball to the focal point as focal length. The detection unit 12 detects, for example, the position of the line of sight in the real space on the display screen of the other display 20 (the position of the intersection of the line of sight and the display screen, for example, the coordinates on the display screen) as the direction of the line of sight. The detection of the line of sight in the real space from an image may be performed in the same way as a conventional method. Alternatively, the other display 20 may perform a process of detecting the line of sight of the user in the real space from the above image, and transmit information on the detection result to the display 10. The detection unit 12 receives the information on the detection result from the other display 20 and detects the line of sight of the user in the real space.

The detection unit 12 may detect whether the user is walking as the user's movement state. In this case, the other display 20 is provided with, for example, an acceleration sensor. The other display 20 transmits information obtained by the acceleration sensor to the display 10. The detection unit 12 receives the information from the other display 20. The detection unit 12 detects whether the user is walking from the information obtained by the acceleration sensor received from the other display 20. The detection of whether the user is walking from the acceleration may be performed in the same way as a conventional method. Alternatively, the other display 20 may be provided with a positioning function of its own device based on a Global Positioning System (GPS) or the like, and the detection unit 12 may detect whether the user is moving (for example, walking) or stationary on the basis of information indicating the position of the other display 20 obtained by the positioning function. This detection may also be performed in the same way as a conventional method.

The detection unit 12 continuously detects the state of a user, for example, at regular time intervals. The detection unit 12 outputs information indicating the detected state of the user to the control unit 14 every time the detection is performed. Meanwhile, the detection unit 12 need only detect at least any of the states of the user described above. In addition, the detection unit 12 may detect the state of the user using methods other than those described above. Alternatively, the detection unit 12 may detect the state of the user other than the above-described state insofar as it is useful for control performed by the control unit 14 to be described later.

The visual field information acquisition unit 13 is a functional unit that acquires information on the visual field of the virtual space corresponding to the line of sight in the virtual space on the other display 20. For example, the visual field information acquisition unit 13 receives and acquires the information on the visual field of the virtual space from the other display 20. For example, the other display 20 transmits information indicating the range displayed on the display screen of the other display 20 as the information on the visual field of the virtual space to the display 10. The range displayed on the display screen is the region 300 of the sphere 100 which is visible in the direction of the line of sight in the virtual space from the reference position of the line of sight in the virtual space shown in FIG. 2.

Alternatively, the other display 20 transmits information that enables calculation of the range displayed on the display screen of the other display 20, for example, information indicating the reference position of the line of sight in the virtual space and the direction of the line of sight in the virtual space, as the information on the visual field of the virtual space to the display 10. Meanwhile, in a case where the line of sight is moved in 3DoF as described above, the reference position of the line of sight is a fixed position in the virtual space, and thus it does not need to be included in the information on the visual field of the virtual space.

The visual field information acquisition unit 13 continuously acquires the information on the visual field of the virtual space, for example, at regular time intervals in the same way as the detection performed by the detection unit 12. The visual field information acquisition unit 13 outputs the acquired information on the visual field of the virtual space to the control unit 14 every time it is acquired.

The control unit 14 is a functional unit that controls an operation related to display on the display 10 in accordance with the state of the user detected by the detection unit 12 and the information on the visual field of the virtual space acquired by the visual field information acquisition unit 13. The control unit 14 may determine whether to perform control in accordance with the focal length detected by the detection unit 12. The control unit 14 may set the region related to control in accordance with the direction of the line of sight in the real space detected by the detection unit 12.

The control unit 14 may set the region related to control in accordance with the information on the visual field of the virtual space acquired by the visual field information acquisition unit 13, and control an operation related to display on the display 10 associated with the set region. The control unit 14 may perform control to prohibit an operation for changing the display of display information in the set region.

The control performed by the control unit 14 is intended, for example, to prevent the operation on the display 10 from interfering with a user who wears the other display 20. Since the other display 20 is of a transmissive type, the user who wears the other display 20 can also perform actions other than looking at the display 20. For example, the user can look at a bus timetable or walk while the display 20 is displayed.

Figure 4:
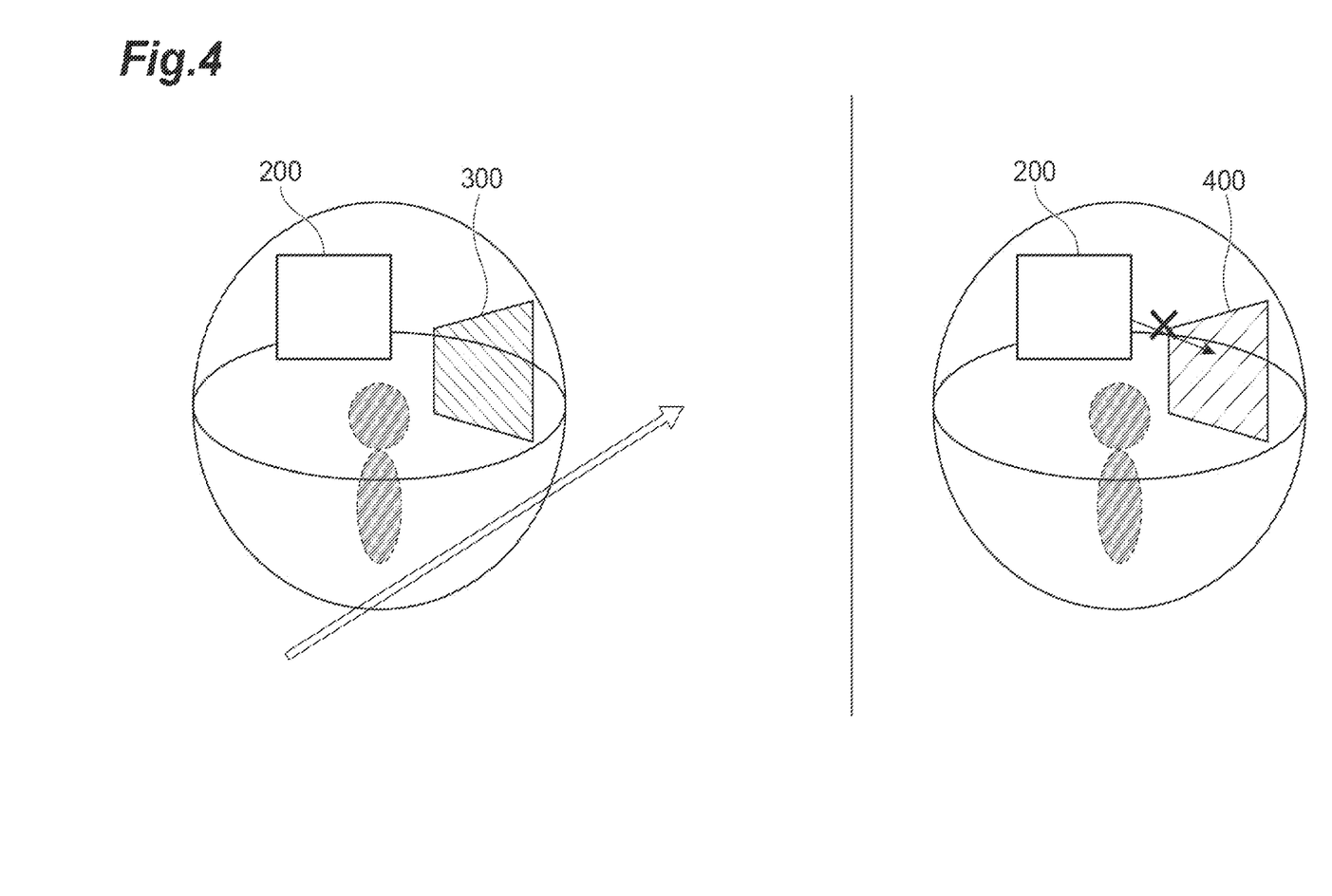
FIG. 4 is a diagram illustrating an example of control of display on the display.

For example, it is assumed that, as shown on the left side of FIG. 4, the user who wears the other display 20 is walking in the direction indicated by the arrow. In this case, the other display 20 displays the region 300 corresponding to the line of sight in the virtual space on the other display 20. At that time, it is assumed that the display information 200 is moved to a region located at the same position as the region 300 in the virtual space by an operation on the display 10. By sharing the virtual space and display information, the display information 200 is also moved to the region 300 on the other display 20. This movement causes the display information 200 that has not been displayed up to now to be displayed on the other display 20.

The newly displayed display information 200 obstructs the visual field of the users of the other display 20 and interferes with the user's walking. In addition, the user of the other display 20 may be unable to see his/her surroundings, which is dangerous. This is especially dangerous when the user of the other display 20 is walking at a crosswalk. Alternatively, even in a case where the user of the other display 20 is performing an action of looking at a real space other than walking without looking at the display on the other display 20, the newly displayed display information 200 may interfere with the user's action. In this way, in a case where the user of the other display 20 is performing an action such as working in the real world other than looking at the other display 20, the operation of the user of the display 10 may interfere with the action of the user of the other display 20. The user of the other display 20 in this case does not want his/her visual field to be blocked. The control performed by the control unit 14 is to prevent the operation of the user of the display 10 from interfering with the action of the user of the other display 20. However, the control performed by the control unit 14 does not necessarily have to be performed for the purposes described above, and may be performed for purposes other than the above. For example, the control unit 14 performs control as follows.

The control unit 14 inputs information indicating the state of the user of the other display 20 from the detection unit 12. The control unit 14 inputs the information on the visual field of the virtual space from the visual field information acquisition unit 13. The control unit 14 determines whether to control the operation related to display on the display 10, that is, to control the operation performed by the user of the display 10, from the information input from the detection unit 12 on the basis of determination criteria stored in advance. For example, in a case where the information input from the detection unit 12 indicates the focal length in the real space, the control unit 14 makes the above determination depending on whether the focal length is included in a range set in advance. The above range is, for example, a range in which it can be determined that the focus of the user who wears the other display 20 is on the display screen of the other display 20, that is, it can be determined that the user is looking at the display screen of the other display 20.

In a case where the focal length is not included in the above range, it is assumed that the user is not looking at the display screen of the other display 20 but, for example, looking at (gazing at) something in the real world, and the control unit 14 determines to control the operation related to display on the display 10. In a case where the focal length is included in the above range, it is assumed that the user is looking at the display screen of the other display 20, and the control unit 14 determines not to control the operation related to display on the display 10. This is because when the user is looking at the display screen of the other display 20, the operation on the display 10 is considered not to interfere with the user.

Alternatively, in a case where the information input from the detection unit 12 indicates that the user is walking, the control unit 14 determines to control the operation related to display on the display 10, and in a case where the information input from the detection unit 12 indicates that the user is not walking, the control unit 14 determines not to control the operation related to display on the display 10. In a case where it is determined whether to control the operation related to display on the display 10 on the basis of a plurality of determination criteria, the control unit 14 determines to perform control based on any of the determination criteria, and then finally determines to perform control (even if it is determined not to perform control based on other determination criteria).

In a case where it is (finally) determined that the user's operation related to display on the display 10 is to be controlled, the control unit 14 sets a region 400 related to control in accordance with the information on the visual field of the virtual space input from the visual field information acquisition unit 13. The control unit 14 notifies the display unit 11 of the set region 400 and performs control according to the region 400. The control is, for example, to prohibit the operation related to display on the display 10 associated with the set region 400. Specifically, as shown on the right side of FIG. 4, this control is to prohibit an operation of moving the display information 200 from outside the set region 400 to the set region 400. The operation to be controlled is not limited to the above, and may include an operation of moving the display information 200 from the set region 400 to outside the set region 400. In addition, the operation to be controlled may include an operation of enlarging, reducing, or moving the display information within the set region 400. In addition, the control may be to prohibit a portion of the operation. For example, in a case where the operation is to move the display information, the control may be to move the display information slightly without moving it completely as per the operation.

Figure 5:
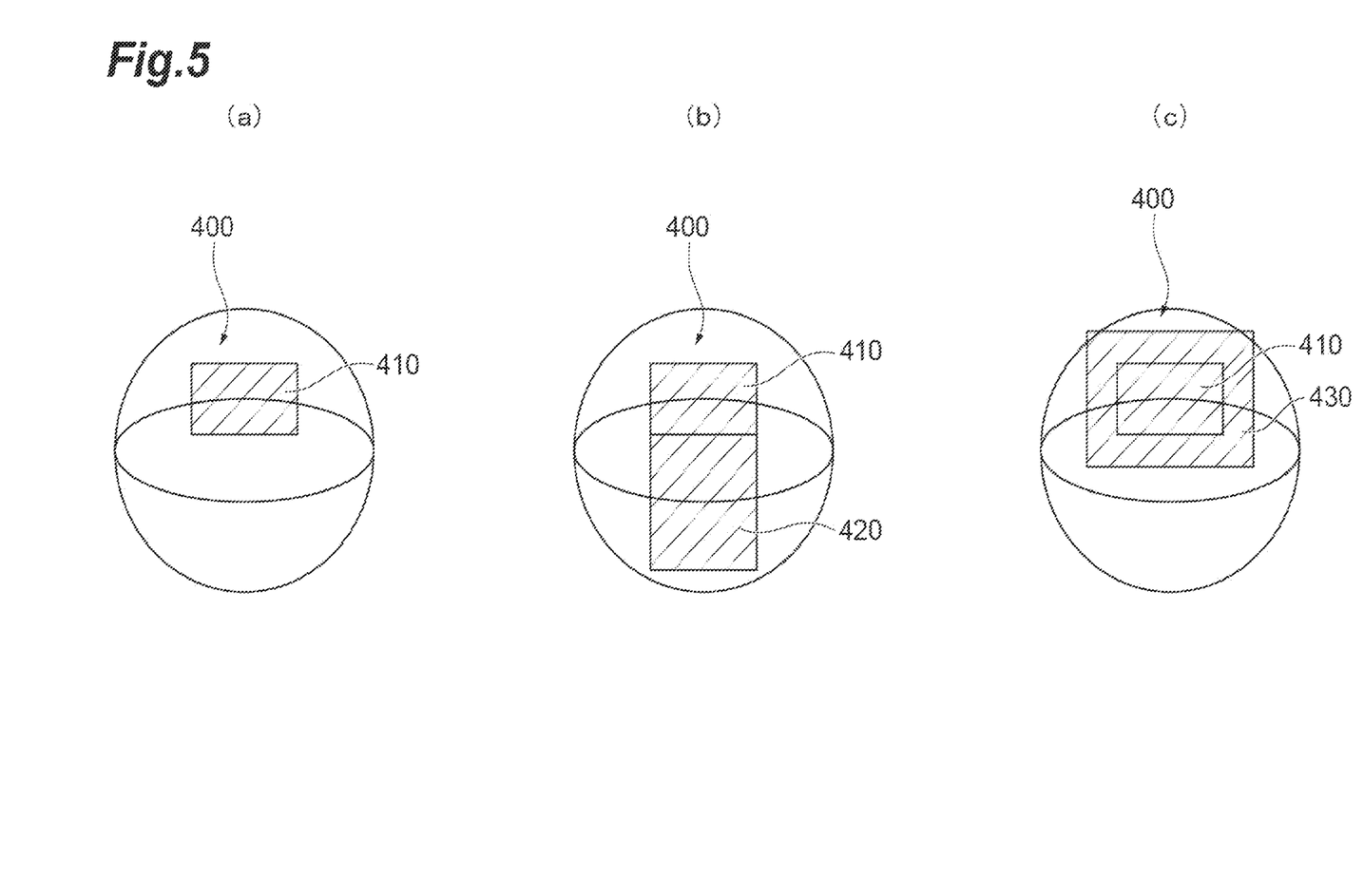
FIG. 5 is a diagram illustrating an example of regions related to control.

The control unit 14 sets, for example, the region 400 related to control as follows. The control unit 14 sets the region 400 related to control based on the region 300 displayed on the other display 20 in accordance with the information on the visual field of the virtual space acquired by the visual field information acquisition unit 13. For example, as shown in FIG. 5(*a*), the control unit 14 sets a region 410 in the virtual space located at the same position as the region 300 corresponding to the line of sight in the virtual space displayed on the other display 20 as the region 400 related to control. The position of the region 300 described above is indicated by the information on the visual field of the virtual space. Alternatively, as shown in FIG. 5(*b*), the control unit 14 sets the region 400 so as to include the region 410 in the virtual space located at the same position as the region 300 on the other display 20 and further include an region 420 obtained by extending the region 410 in one direction. The direction in which the region 420 is provided is, for example, the direction of the virtual space corresponding to the vertically downward direction in the real space. The direction and the size of the region 420 are set in advance. By setting the region 400 in this way, the visual field of the user of the other display 20 can be secured even when the user faces downward (for example, when the user looks at his/her feet).

Alternatively, as shown in FIG. 5(*c*), the control unit 14 sets the region 400 so as to include the region 410 in the virtual space located at the same position as the region 300 on the other display 20 and further include a region 430 around the region 410. The region 430 is, for example, a rectangle which is larger than the rectangular region 410 such that it includes the rectangular region 410. The position of the region 430 with respect to the region 410 and the size of the region 430 are set in advance. By setting the region 400 in this way, the visual field of the user of the other display 20 can be secured even when the direction of the user moves slightly.

The display unit 11 receives control from the control unit 14 and performs processing according to the control. When the display unit 11 accepts the operation related to display on the display 10 during control from the control unit 14, the display unit identifies whether the operation is an operation to be controlled. For example, the display unit 11 determines whether the accepted operation is to perform the movement of display information or the like included in the region 400 set by the control unit 14. In a case where the accepted operation is determined to perform the movement of display information or the like included in the region 400 set by the control unit 14, the display unit 11 identifies the operation as an operation to be controlled. In a case where the operation is identified as an operation to be controlled, the display unit 11 prohibits the operation. In a case where the operation is identified as not being an operation to be controlled, the display unit 11 executes the operation without prohibiting it.

When performing control, the control unit 14 may cause the display 10 to display the region 400 so that the user of the display 10 can recognize the region 400 related to the control. For example, the frame portion of the region 400 or the entire region may be colored and displayed on the display 10.

In addition, the control does not necessarily have to be control to prohibit an operation, but may be control to change display related to the operation. For example, control may be performed such that the display information related to the operation to be controlled is made non-displayed or semi-transparent or only a frame is displayed. Alternatively, control may be performed to display the display information related to the operation to be controlled at a position set in advance on the display 10, for example, at a position which is a corner of the visual field. In addition, control other than those described above may be performed insofar as it complies with the purpose described above. In a case where the control unit 14 (finally) determines not to control the user's operation related to display on the display 10, it does not perform the above control.

In addition, the control unit 14 may also use information input from the detection unit 12 to set the region 400 related to control on the basis of the determination criteria stored in advance. For example, in a case where the information input from the detection unit 12 indicates the direction of the line of sight in the real space, the control unit 14 also sets the region 400 related to control based on the direction of the line of sight. The control unit 14 specifies the position of the sphere 100 in the virtual space corresponding to the position of the line of sight on the display screen which is the direction of the line of sight. The specification may be performed using a conventional method. The control unit 14 calculates a region along the sphere 100 based on the specified position. The region is, for example, a circular or rectangular region or the like set in advance which is centered on a specified position. The control unit 14 sets an overlapping portion between the calculated region and the region 400 related to control set in accordance with the information on the visual field of the virtual space, as described above, as the region 400 related to final control. By setting the region 400 related to control in this way, the region 400 can be made to be in line with the line of sight of the user of the other display 20 in the real space. The above are the functions of the display 10 according to the present embodiment.

Figure 6:
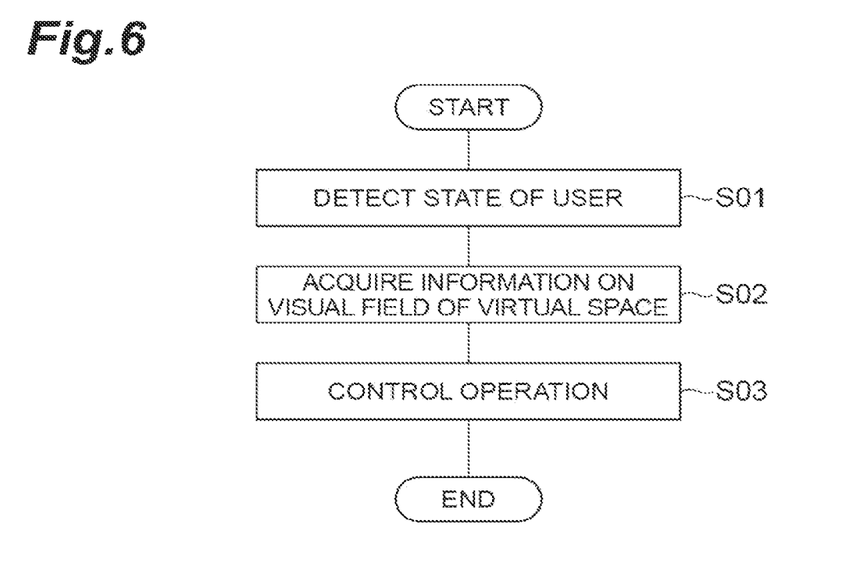
FIG. 6 is a flowchart illustrating processing executed by a display which is a display control device according to an embodiment of the present invention.

Subsequently, processing executed by the display 10 according to the present embodiment (an operation method performed by the display 10) will be described with reference to the flowchart of FIG. 6. This processing is performed when the display unit 11 performs display on the display 10. In addition, on the other display 20 worn by a user, the virtual space and display information are shared with the display 10 and display is performed accordingly.

In this processing, the detection unit 12 detects the state of the user who wears the other display 20 (S01). The state of the user is detected on the basis of information transmitted from the other display 20. Subsequently, the visual field information acquisition unit 13 receives and acquires the information on the visual field of the virtual space corresponding to the line of sight in the virtual space on the other display 20 from the other display 20 (S02). Subsequently, the control unit 14 controls the operation related to display on the display 10 with respect to the display unit 11 in accordance with the above state of the user and information on the visual field of the virtual space (S03). The above processing (S01 to S03) is repeatedly performed while the display unit 11 and the other display 20 perform display. The above is the processing executed by the display 10 according to the present embodiment.

In the present embodiment, the operation related to display on the display 10 is controlled in accordance with the state of the user who wears the other display 20 and the information on the visual field of the virtual space. For example, the display can be controlled so that the display on the other display 20 due to display on the display 10 does not interfere with the user in accordance with the state of the user who wears the other display 20. Therefore, according to the present embodiment, in a case where information on a common virtual space between the plurality of displays 10 and 20 is displayed, it is possible to appropriately display the information.

As in the present embodiment, the line of sight of the user in the real space may be detected as the state of the user who wears the other display 20. More specifically, the focal length of the line of sight of the user in the real space may be detected to determine whether control is performed in accordance with the focal length. According to such a configuration, for example, it is possible to perform control in a case where the user is not looking at the display screen of the other display 20, and to prevent the display on the other display 20 from interfering with the user or putting the user in danger.

Alternatively, the direction of the line of sight of the user in the real space may be detected, and the region 400 related to control may be set in accordance with the direction of the line of sight. According to such a configuration, for example, it is possible to control only the necessary region 400 in accordance with the direction of the line of sight of the user, and to perform display on the display 10 more appropriately.

In addition, as in the present embodiment, as the state of the user who wears the other display 20, the movement state of the user, more specifically, whether the user is walking, may be detected. According to such a configuration, for example, it is possible to perform control in a case where the user is walking, and to prevent danger from occurring when the user is walking due to the display on the other display 20. Meanwhile, the state of the user who wears the other display 20 is not limited to the above, and any other state may be detected and used insofar as it is useful for controlling the display. For example, a state such as whether the user is cooking, looking at a signboard, or having a conversation may be detected.

In addition, as in the present embodiment, the region 400 related to control may be set in accordance with the information on the visual field of the virtual space, and the operation related to display on the display 10 associated with the set region 400 may be controlled. The control may be control to prohibit an operation of changing the display of display information in the set region 400. According to such a configuration, the display on the display 10 can be performed appropriately and reliably in accordance with the state of the user of the other display 20. However, control other than the above may be performed insofar as the control is to appropriately perform display on the display 10.

In addition to the above information or instead of the above information, the detection unit 12 may detect a state related to the user's heartbeat or perspiration as the state of the user who wears the other display 20. Specifically, the detection unit 12 may detect the user's heart rate or amount of perspiration, or both of them. In this case, a sensor that detects the heart rate or a sensor that detects the amount of perspiration is attached to the user, and the display 10 acquires information indicating the user's heart rate or amount of perspiration from the sensor through the other display 20. Conventional sensors can be used as these sensors.

In this case, the control unit 14 also determines whether to control the operation related to display on the display 10 from the information input from the detection unit 12 on the basis of the determination criteria stored in advance in the same way as the above. For example, the control unit 14 determines to perform control in a case where the sensor or amount of perspiration indicated by the information input from the detection unit 12 is equal to or greater than a threshold set in advance, or a case where it is equal to or less than the threshold set in advance. With the above configuration, display can be performed appropriately depending on the heart rate or amount of perspiration of the user who wears the other display 20.

Although the display control device has been described as the display 10 having a display function in the above-described embodiment, it does not necessarily have to have a display function. The display control device is a device (system) connected to a display that displays display information commonly arranged in a common virtual space with the other display (that is, including the display unit 11) in accordance with the line of sight of each display in the virtual space to control display on the display, and need only include the detection unit 12, the visual field information acquisition unit 13, and the control unit 14 described above.

Meanwhile, the block diagram used in the description of the above embodiment represents blocks in units of functions. These functional blocks (constituent elements) are realized by any combination of at least one of hardware and software. In addition, a method of realizing each functional block is not particularly limited. That is, each functional block may be realized using one device which is physically or logically coupled, or may be realized using two or more devices which are physically or logically separated from each other by connecting the plurality of devices directly or indirectly (for example, using a wired or wireless manner or the like). The functional block may be realized by combining software with the one device or the plurality of devices.

Examples of the functions include determining, deciding, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating (or mapping), assigning, and the like, but there is no limitation thereto. For example, a functional block (constituent element) for allowing a transmitting function is referred to as a transmitting unit or a transmitter. In either case, as described above, realization methods are not particularly limited.

Figure 7:
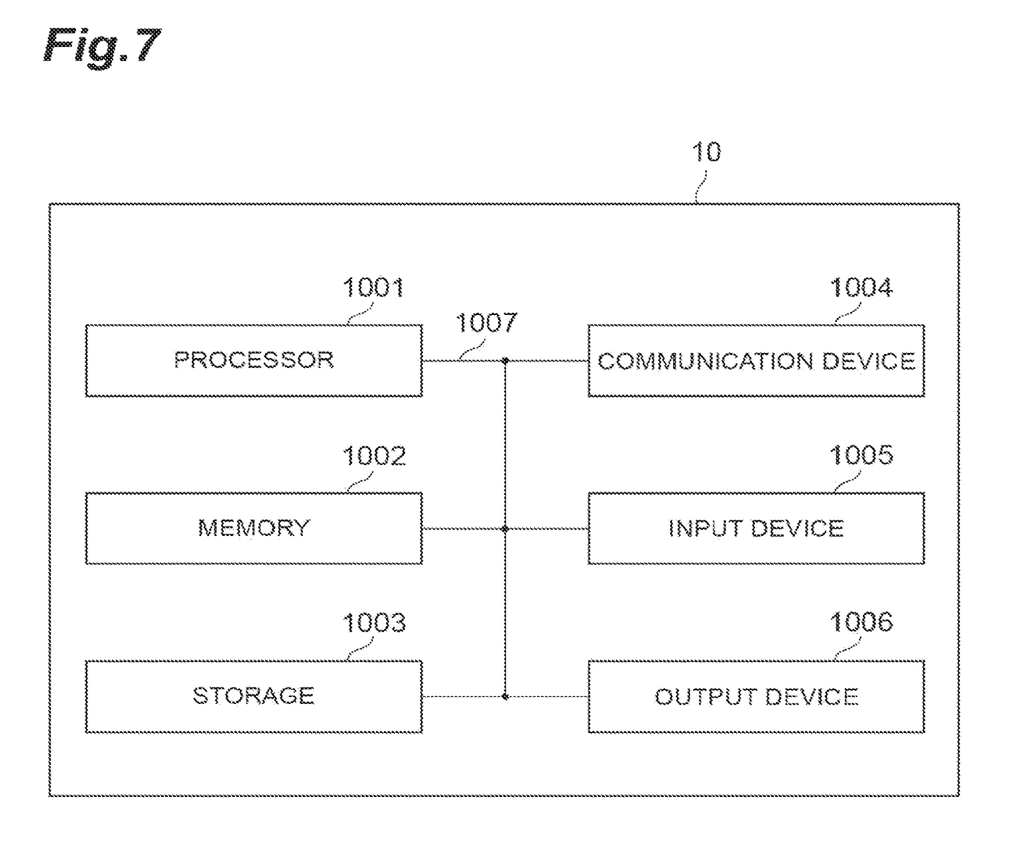
FIG. 7 is a diagram illustrating a hardware configuration of the display which is a display control device according to an embodiment of the present invention.

For example, the display 10 in an embodiment of the present disclosure may function as a computer that performs information processing of the present disclosure. FIG. 7 is a diagram illustrating an example of a hardware configuration of the display 10 according to an embodiment of the present disclosure. The above-described display 10 may be physically configured as a computer device including a processor 1001, a memory 1002, a storage 1003, a communication device 1004, an input device 1005, an output device 1006, a bus 1007, and the like. In addition, the hardware configuration of the other display 20 may also be described here.

Meanwhile, in the following description, the word "device" may be replaced with "circuit," "unit," or the like. The hardware configuration of the display 10 may be configured to include one or a plurality of devices shown in the drawings, or may be configured without including some of the devices.

The processor 1001 performs an arithmetic operation by reading predetermined software (a program) onto hardware such as the processor 1001 or the memory 1002, and thus each function of the display 10 is realized by controlling communication in the communication device 1004 or controlling at least one of reading-out and writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, each function in the above-described display 10 may be realized by the processor 1001.

In addition, the processor 1001 reads out a program (a program code), a software module, data, or the like from at least one of the storage 1003 and the communication device 1004 into the memory 1002, and executes various types of processes in accordance therewith. An example of the program which is used includes a program causing a computer to execute at least some of the operations described in the foregoing embodiment. For example, each function in the display 10 may be realized by a control program which is stored in the memory 1002 and operates in the processor 1001. Although the execution of various types of processes by one processor 1001 has been described above, these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (a program code), a software module, or the like that can be executed in order to carry out information processing according to an embodiment of the present disclosure.

The storage 1003 is a computer readable recording medium, and may be constituted by at least one of, for example, an optical disc such as a compact disc ROM (CD-ROM), a hard disk drive, a flexible disk, a magneto-optic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium included in the display 10 may be, for example, a database including at least one of the memory 1002 and the storage 1003, a server, or another suitable medium.

The communication device 1004 is hardware (a transmitting and receiving device) for performing communication between computers through at least one of a wired network and a wireless network, and is also referred to as, for example, a network device, a network controller, a network card, a communication module, or the like.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be configured using a single bus, or may be configured using different buses between devices.

In addition, the display 10 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, the processor 1001 may be mounted using at least one of these types of hardware.

The order of the processing sequences, the sequences, the flowcharts, and the like of the aspects/embodiments described above in the present disclosure may be changed as long as they are compatible with each other. For example, in the methods described in the present disclosure, various steps as elements are presented using an exemplary order but the methods are not limited to the presented specific order.

The input or output information or the like may be stored in a specific place (for example, a memory) or may be managed using a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects/embodiments described in the present disclosure may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Hereinbefore, the present disclosure has been described in detail, but it is apparent to those skilled in the art that the present disclosure should not be limited to the embodiments described in the present disclosure. The present disclosure can be implemented as modified and changed aspects without departing from the spirit and scope of the present disclosure, which are determined by the description of the scope of claims. Therefore, the description of the present disclosure is intended for illustrative explanation only, and does not impose any limited interpretation on the present disclosure.

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, software, a command, information, and the like may be transmitted and received through a transmission medium. For example, when software is transmitted from a website, a server, or another remote source using at least one of wired technology (such as a coaxial cable, an optical fiber cable, a twisted-pair wire, or a digital subscriber line (DSL)) and wireless technology (such as infrared rays or microwaves), at least one of the wired technology and the wireless technology are included in the definition of a transmission medium.

The terms "system" and "network" which are used in the present disclosure are used interchangeably.

In addition, information, parameters, and the like described in the present disclosure may be expressed using absolute values, may be expressed using values relative to a predetermined value, or may be expressed using other corresponding information.

The term "determining" which is used in the present disclosure may include various types of operations. The term "determining" may include regarding operations such as, for example, judging, calculating, deriving, investigating, looking computing, processing, up/search/inquiry (for example, looking up in a table, a database or a separate data structure), or ascertaining as an operation such as "determining." In addition, the term "determining" may include regarding operations such as receiving (for example, receiving information), transmitting (for example, transmitting information), input, output, or accessing (for example, accessing data in a memory) as an operation such as "determining." In addition, the term "determining" may include regarding operations such as resolving, selecting, choosing, establishing, or comparing as an operation such as "determining." That is, the term "determining" may include regarding some kind of operation as an operation such as "determining." In addition, the term "determining" may be replaced with the term "assuming," "expecting," "considering," or the like.

The terms "connected" and "coupled" and every modification thereof refer to direct or indirect connection or coupling between two or more elements and can include that one or more intermediate element is present between two elements "connected" or "coupled" to each other. The coupling or connecting of elements may be physical, may be logical, or may be a combination thereof. For example, "connection" may be read as "access." In the case of use in the present disclosure, two elements can be considered to be "connected" or "coupled" to each other using at least one of one or more electrical wires, cables, and printed electric connections or using electromagnetic energy or the like having wavelengths in a radio frequency range, a microwave area, and a light (both visible light and invisible light) area as non-restrictive and non-comprehensive examples.

An expression "on the basis of" which is used in the present disclosure does not refer to only "on the basis of only," unless otherwise described. In other words, the expression "on the basis of" refers to both "on the basis of only" and "on the basis of at least."

Any reference to elements having names such as "first" and "second" which are used in the present disclosure does not generally limit amounts or an order of the elements. The terms can be conveniently used to distinguish two or more elements in the present disclosure. Accordingly, reference to first and second elements does not mean that only two elements are employed or that the first element has to precede the second element in any form.

In the present disclosure, when the terms "include," "including," and modifications thereof are used, these terms are intended to have a comprehensive meaning similarly to the term "comprising." Further, the term "or" which is used in the present disclosure is intended not to mean an exclusive logical sum.

In the present disclosure, when articles are added by translation like, for example, "a," "an" and "the" in English, the present disclosure may include that nouns that follow these articles are plural forms.

In the present disclosure, an expression "A and B are different" may mean that "A and B are different from each other." Meanwhile, the expression may mean that "A and B are different from C." The terms "separated," "coupled," and the like may also be construed similarly to "different."

REFERENCE SIGNS LIST

10 Display
11 Display unit
12 Detection unit
13 Visual field information acquisition unit
14 Control unit
20 Other display
1001 Processor
1002 Memory
1003 Storage
1004 Communication device
1005 Input device
1006 Output device
1007 Bus

The invention claimed is:

1. A display control device configured to control display on a display that displays display information commonly arranged in a common virtual space with another display in accordance with a line of sight of each display in the virtual space, the device comprising circuitry configured to:
   determine a state of a user who wears the other display;
   acquire information on a visual field of the virtual space corresponding to the line of sight in the virtual space on the other display; and
   control to prohibit an operation to display said display information on the display in accordance with the determined state of the user and the acquired information on the visual field of the virtual space,
   wherein the circuitry
      detects the line of sight of the user in a real space based on a reference position and the acquired information on the visual field,
      detects a focal length of the line of sight of the user in the real space, and
      determines the state of the user who wears the other display based on the focal length,
   wherein the circuitry prohibits the operation to display on the display when the detected focal length is not included in a range set in advance, which corresponds to a range in which a focus of the user who wears the other display is on a display screen of the other display, and does not prohibit the operation to display on the display when the detected focal length is included in the range.

2. The display control device according to claim 1, wherein the circuitry detects a direction of the line of sight of the user in the real space as the state of the user who wears the other display, and
   sets a region related to the control in accordance with the detected direction of the line of sight in the real space.

3. The display control device according to claim 1, wherein the circuitry detects a movement state of the user, and the state of the user who wears the other display is determined based additionally on the movement state.

4. The display control device according to claim 1, wherein the circuitry sets a region related to the control in accordance with the acquired information on the visual field of the virtual space, and prohibits the operation to display on the display associated with the set region.

5. The display control device according to claim 4, wherein the circuitry performs control to prohibit operation of changing display of display information in the set region.

6. The display control device according to claim 1, wherein circuitry detects a state related to a heartbeat or perspiration of the user, and the state of the user who wears the other display is determined based additionally on the state related to the heartbeat or perspiration.

7. A method, implemented by circuitry of a display control device configured to control display on a display that displays display information commonly arranged in a common virtual space with another display in accordance with a line of sight of each display in the virtual space, the method comprising:
   determining a state of a user who wears the other display;
   acquiring information on a visual field of the virtual space corresponding to the line of sight in the virtual space on the other display; and
   controlling by prohibiting an operation to display said display information on the display in accordance with the determined state of the user and the acquired information on the visual field of the virtual space,
   wherein the method further includes
      detecting the line of sight of the user in a real space based on a reference position and the acquired information on the visual field,
      detecting a focal length of the line of sight of the user in the real space, and
      determining the state of the user who wears the other display,
   wherein the prohibiting of the operation to display on the display is performed when the detected focal length is not included in a range set in advance, which corresponds to a range in which a focus of the user who wears the other display is on a display screen of the other display, and the prohibiting of the operation to display on the display is not performed when the detected focal length is included in the range.

* * * * *